United States Patent [19]

Boianjiu et al.

[11] Patent Number: 5,695,303
[45] Date of Patent: Dec. 9, 1997

[54] CUTTING INSERT WITH UNDULATING CONCAVE CHIP FORMING GROOVE

[75] Inventors: Gideon Boianjiu; Jacob Harpaz, both of Kfar Vradim, Israel

[73] Assignee: Iscar, Ltd., Migdal, Israel

[21] Appl. No.: 407,150

[22] Filed: Mar. 20, 1995

[30] Foreign Application Priority Data

Mar. 21, 1994 [IL] Israel ......................... 109054

[51] Int. Cl.⁶ .................. B23B 27/16; B23C 5/20
[52] U.S. Cl. ............................ 407/114; 407/115
[58] Field of Search ..................... 407/114–116

[56] References Cited

U.S. PATENT DOCUMENTS

| | | |
|---|---|---|
| 3,963,365 | 6/1976 | Shallenberger . |
| 4,215,957 | 8/1980 | Holma et al. . |
| 4,988,242 | 1/1991 | Pettersson et al. ............ 407/116 |
| 5,044,840 | 9/1991 | Fouquer et al. ............... 407/114 |
| 5,074,720 | 12/1991 | Loqvist et al. ............... 407/114 |
| 5,116,167 | 5/1992 | Niebauer ........................ 407/114 |
| 5,158,402 | 10/1992 | Satran et al. . |
| 5,203,649 | 4/1993 | Katbi et al. ................... 407/114 |
| 5,282,703 | 2/1994 | Itaba et al. ................... 407/114 |

FOREIGN PATENT DOCUMENTS

| | | |
|---|---|---|
| 0307563 A | 3/1989 | European Pat. Off. . |
| 1 602 795 | 4/1970 | Germany . |
| 103115 | 3/1994 | Israel . |
| WO 93/11898 | 6/1993 | WIPO . |

*Primary Examiner*—M. Rachuba
*Assistant Examiner*—Kenneth J. Hansen
*Attorney, Agent, or Firm*—Pennie & Edmonds, LLP.

[57] ABSTRACT

A cutting insert for use in a cutting tool has upper, lower and side surfaces and at least one cutting edge formed at an intersection of the upper surface with the side surface thereof. A rake face of the insert is formed with an undulated chip forming groove extending along the cutting edge and comprising a succession of alternating depressed and raised portions. Each raised portion of the chip forming groove is formed with a truncated top portion of a width which is substantially less than a distance between two adjacent truncated top portions. The depressed and raised portions preferably extend, in the direction perpendicular to the cutting edge, along the entire width of the chip forming groove.

17 Claims, 8 Drawing Sheets

CUTTING INSERT WITH UNDULATING CONCAVE CHIP FORMING GROOVE

FIELD OF THE INVENTION

The present invention refers to a cutting insert to be used in cutting tools for chip-forming machining operations, in particular for such operations as, for example, drilling, boring and turning operations.

BACKGROUND OF THE INVENTION

It is well known that in the design of cutting inserts and their mounting in a cutting tool, the provision of suitable cutting rake and relief clearance angles so as to ensure effective cutting with minimal energy consumption have to be balanced against undue weakening of the cutting edge. At the same time, however, provision must always be made for the effective removal of the chips generated in the cutting process. This latter requirement is particularly vital where the cutting tool operates in a very confined space (e.g. in drilling operations).

The effective removal of the generated chips is to a large extent dependant on the provision of effective chip control designed to ensure that the generated chips are diverted from the cutting area having been deformed and split or broken into relatively short chips, all with minimal energy consumption coupled with effective heat dissipation.

To this end, it is well known to provide the insert, in the region of the or each cutting edge thereof, with suitably formed depressions or grooves or with protrusions all of which are designed to deform, divert and split the chip so as to meet the above-referred-to requirements.

Thus; for example, U.S. Pat. No. 4,215,957 disclose a substantially flat rake surface of an insert which has, formed adjacent a curling edge thereof, a succession of depressions which, in order to avoid an unduly great weakening of the cutting edge, are spaced along the cutting edge by substantially wide intermediate portions of the rake surface.

In EP 0 307 563, on the other hand, there is disclosed an insert having a rake surface which is undulated both in the direction of a cutting edge and perpendicular thereto, constituting thereby a continuous smoothly undulating chip forming groove with consequent smooth transitions between the differing zones thereof, the arrangement being such that a chip angle in the direction perpendicular to the cutting edge is different at different regions of the chip forming groove.

However, due to the specific shape of the chip forming groove and the smooth transitions between different portions thereof, the ability of such a chip forming groove to provide, during a cutting operation, an effective control of chip orientation to a great extent depends on the positioning of the insert in the tool. Thus, it may very often happen, particularly with cutting inserts positioned in a cutting tool at negative rake angles, that the chips cut by the cutting edge will be deflected in the direction towards rather than away from a workpiece, with consequent possible damage to the workpiece and tool chattering. Such a situation is schematically illustrated in FIG. 11 of the drawings.

Such problems would particularly arise with double-sided indexable inserts. Such inserts can have a negative relief flank geometry such as, for example, disclosed in U.S. Pat. No. 3,963,365 or may be of the so-called "double positive" relief flank geometry to which the present invention particularly, but not exclusively, relates and which are, for example, as disclosed in DE 1 602 795. With such inserts, and in order for the effective employment of their double sided nature and utilization of the maximum number of cutting edges, the insert is formed with identical opposite cutting rake and supporting surfaces and with peripheral side relief surfaces or flanks formed adjacent the respective rake surfaces, each peripheral side relief surface or flank sloping inwardly so as to meet the correspondingly inwardly sloping peripheral side relief surface or flank of the opposite cutting rake surface at an imaginary lateral median plane. In this way, the insert portion on one side of the median plane is the mirror image of the insert portion on the other and opposite side of the median plane. However, in order to ensure that such inserts have an all round adequate clearance, they have to be positioned at negative rake angles. The use of such inserts is preferable from the economical point of view seeing that they have a maximal number of cutting edges. However, in the above-specified operations where the space available for chip evacuation is extremely limited, the use of these inserts renders even more acute the problem of effective chip diversion.

It is an object of the present invention to provide, for use in a cutting tool, a new and improved cutting insert having a chip forming groove enabling an effective chip control.

It is a further object of the present invention to provide an improved indexable cutting insert having a double-positive relief flank geometry and provided with a chip forming groove enabling an effective chip control.

SUMMARY OF THE INVENTION

In accordance with the present invention there is provided a cutting insert for use in a cutting tool, said insert having upper, lower and side surfaces and at least one cutting edge formed at an intersection of the upper surface with the side surface thereof, regions of the upper and side surfaces adjacent the cutting edge constituting respectively rake and relief flank faces, the rake face being formed with an undulated chip forming groove extending along said at least one cutting edge and comprising a succession of alternating depressed and raised portions, characterized in that each raised portion is formed with a substantially truncated top potion of a width which is substantially less than a distance between two adjacent truncated top portions.

Preferably, the depressed and raised portions extend, in the direction perpendicular to the cutting edge, along the entire width of the chip forming groove.

With such an insert wherein the undulated chip forming groove has along the length thereof a succession of narrow truncated top portions each extending all along the width of the chip forming groove, there are formed between the adjacent truncated top portions paths which guide the chip flow in a desired direction away from the cutting edge, the area of contact of the paths with a chip generated during machining of a workpiece being substantially limited, whereby the thermal loading of the insert is reduced.

The width of each truncated portion may be invariant along its length or may decrease in this direction away from the cutting edge or it may be provided along the length thereof with differently shaped curved sections lot varying its width. The truncated top portions can be formed with depressions or protrusions.

In a preferred embodiment of the present invention, the shape of the chip forming groove in the direction perpendicular to the cutting edge is substantially concave, the chip forming groove having a sloping surface extending downwardly away from the cutting edge and smoothly merging with a chip deflecting surface rising upwardly in the direction away from the sloping surface.

Preferably, the chip forming groove is spaced from the cutting edge of the insert by a land. The angle of inclination of the land with respect to an opposite surface of the insert varies along the cutting edge so that a cutting wedge angle of the insert has its maximum value opposite the regions of the truncated top portions, thereby ensuring that the cutting edge of the insert is strengthened in those areas where there is prolonged contact with the workpiece.

In a preferred embodiment of the present invention, the cutting edge has a wavy shape corresponding to the shape of the chip forming groove, however the cutting edge may also be straight or continuously curved, e.g. concave.

According to a preferred embodiment of the present invention, the cutting insert is an indexable cutting insert of substantially polygonal shape, and having a plurality of cutting edges formed at intersections of the side surface of the insert with its upper and lower surfaces, portions of said upper and lower surfaces and of said side surface adjacent each cutting edge of the insert constituting respectively the rake and relief flank faces of the insert. Thus, in a preferred embodiment of the present invention the cutting insert is double-sided.

The cutting insert of the specified design may have either a negative relief flank geometry with the relief flanks being perpendicular to upper and lower surfaces of the insert or it may be of the double-positive kind. This double-positive design is preferable as it provides for increased rake angles and axial and radial clearances and this with the insert being mounted at rake angles less than those required with a conventional negative insert. As a consequence of such increased clearances it is possible to achieve improved conditions for retaining the insert in the tool and for the provision of an effective coolant supply and chip control and evacuation, without an undue weakening of the cutting wedge of the insert.

Thus, the specific design of the chip forming means, according to the present invention, enables the of double-sided inserts, in general, and double-positive inserts, in particular, in the cutting operations of the above-specified kind, where the chip evacuation space is extremely limited and where, in consequence, proper chip control is critical.

BRIEF DESCRIPTION OF THE DRAWINGS

For a better understanding of the present invention and to show how the same may be carried out in practice, and solely by way of example, reference will now be made to the accompanying drawings, in which.

DETAILED DESCRIPTION OF THE PREFERRED EMBODIMENTS

Figure 1:
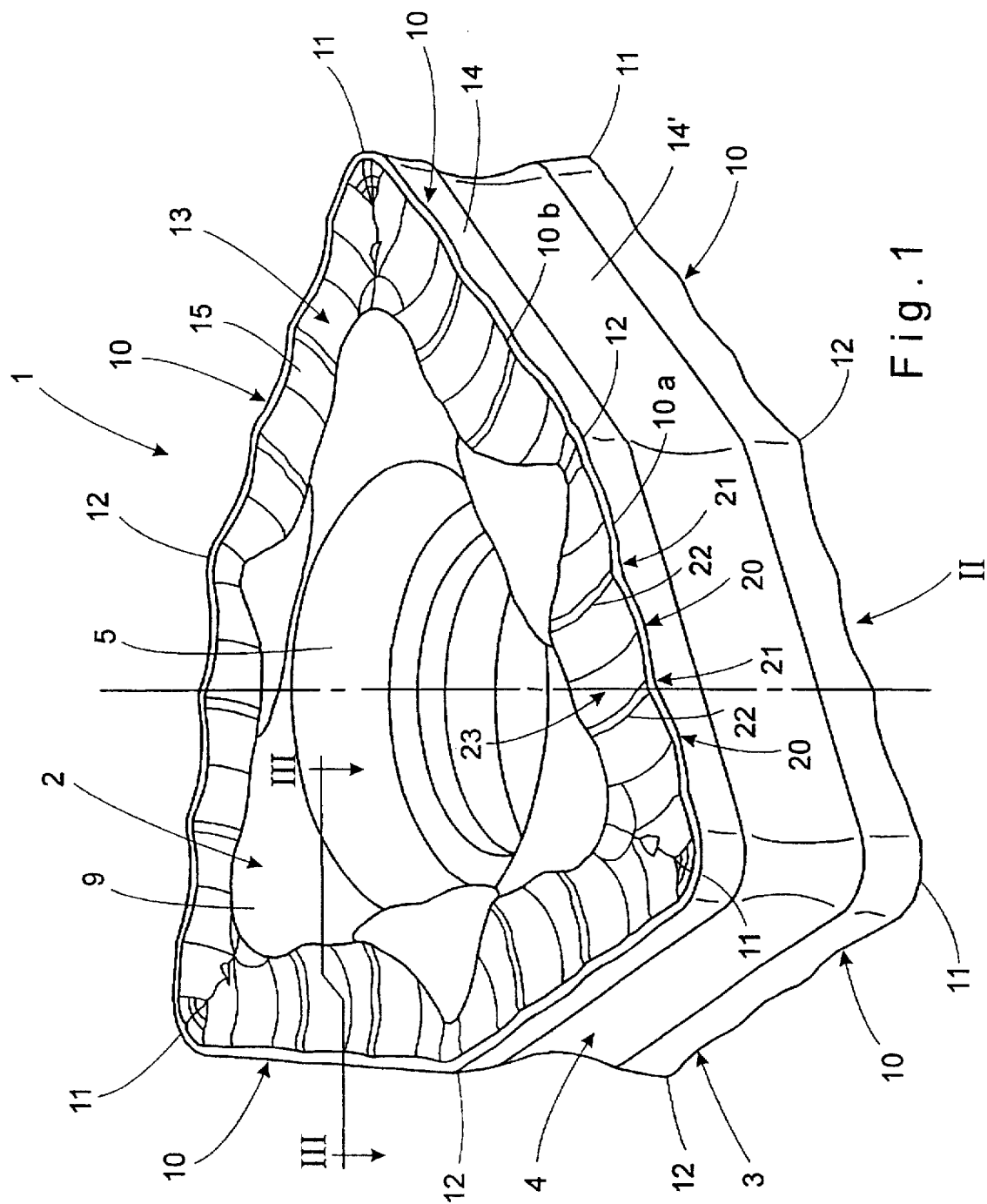
FIG. 1 is a perspective view of a cutting insert according to the present invention.

A cutting insert 1 having chip forming means in accordance with the present invention is shown in FIG. 1. The insert 1 is of generally polygonal, equilateral trinon configuration of known overall shape and has identical and parallel upper and lower surfaces 2 and 3 and a peripheral side surface 4. The insert has a central axis Y perpendicular to the upper and lower surfaces thereof and a mirror symmetry with respect to an imaginary lateral median plane (not shown) normal with respect to the central axis Y and dividing the insert along its height into two identical portions, namely upper and lower portions. The insert has a central through bore 5 for insertion therethrough of a clamping screw.

Each insert portion has generally three cutting edges 10 formed at an intersection of the upper surface 2 or the lower surface 3 with the side surface 4 of the insert and three main cutting corners 11 formed at an intersection of two adjacent cutting edges 10. By virtue of such a design, each of the insert upper and lower cutting edges can be indexed into an active position in the cutting tool and thereby effectively utilized. Each cutting edge 10 is formed with an intermediate cutting corner 12 dividing each cutting edge 10 into two identical component cutting edges 10a, 10b and thereby imparting to each surface 2, 3 of the insert a hexagonal shape. In this way, each of the surfaces, 2, 3 is constituted by six identical portions defined between bisector lines of adjacent main and intermediate corners and ranged symmetrically with respect to the central axis Y.

The upper and lower surfaces 2, 3 of the insert are formed with centrally disposed, substantially planar base surfaces 9 (only one being seen) which project above the main cutting corners 11. The base surface 9 is spaced above the main cutting corners 11 by a height which is preferably in the range of 0.05 mm to 0.4 mm. The base surface 9 serves as an insert support surface when the insert is positioned in a cutting tool.

Figure 9:
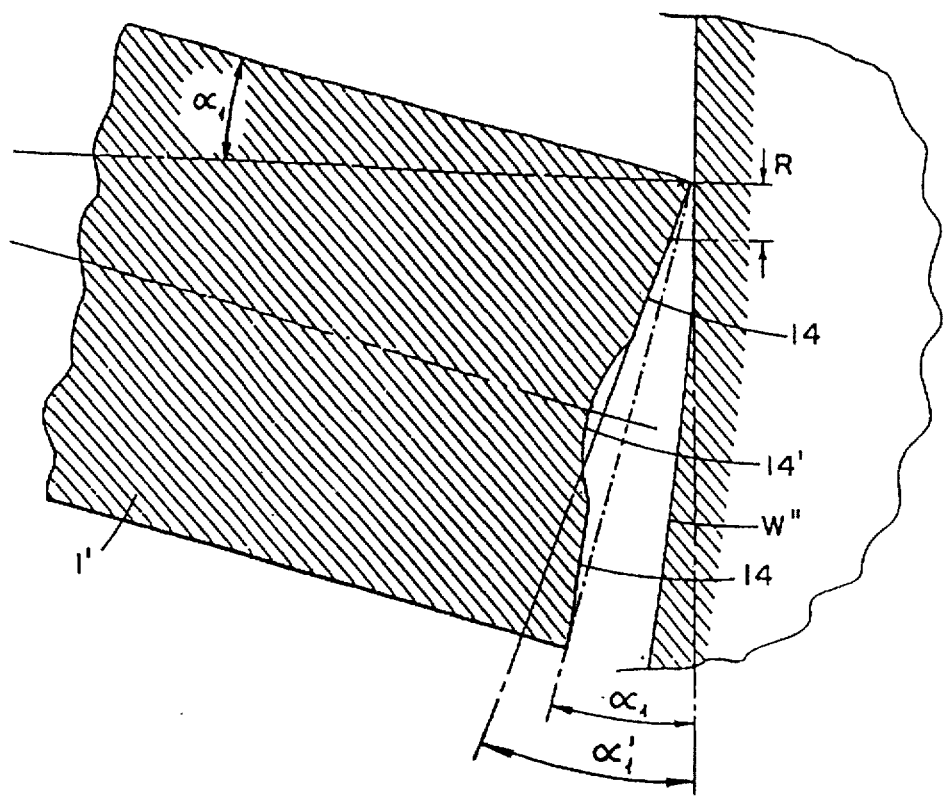
FIGS. 9 and 10 are schematic radial and axial cross-sectional views of the insert illustrating the disposition of an insert according to the present invention during a drilling operation.
Figure 10:
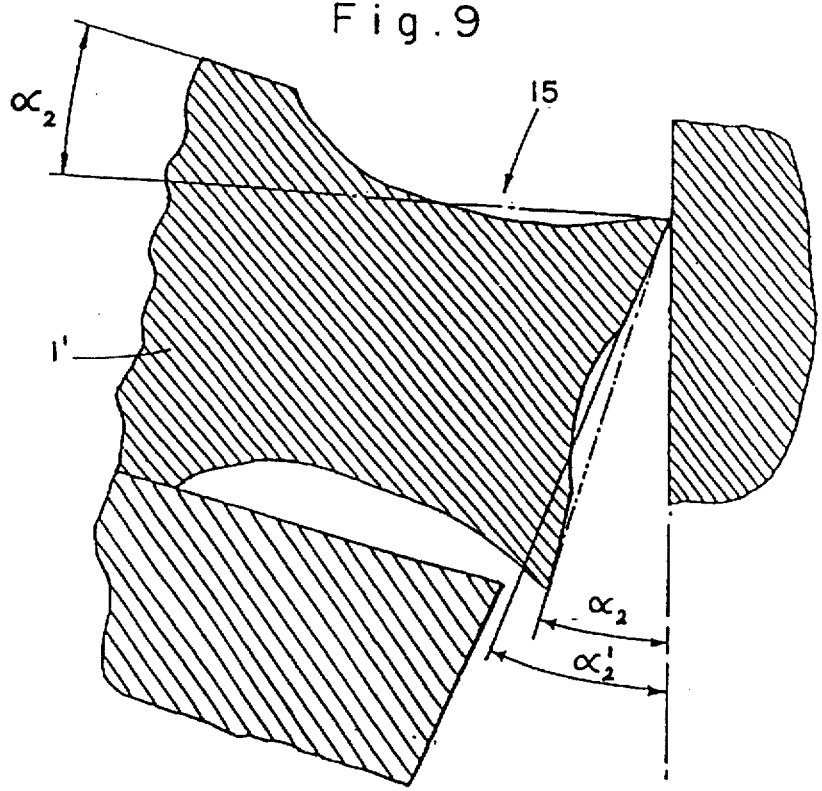

The regions of the surfaces 2, 3 and the side surface 4 adjacent each cutting edge 10 constitute respectively rake faces 13 and relief flanks 14 of the insert portions. Each relief flank 14 has a positive geometry and is preferably planar. Thus, as seen in FIGS. 9 and 10, the relief flanks 14 define, with their rake faces 13, sharp (acute) angles. In consequence, the peripheral side surface 4 of the insert comprises the positive relief flanks 14 of the upper and lower portions, i.e. has a double-positive relief flank geometry. The upper and lower relief flanks 14 merge via an intermediate portion 14', which preferably is of arcuate shape.

Each rake face 13 of the insert 1 is formed with a chip forming groove 15 extending along the cutting edges 10. The chip forming groove 15 has a width which may vary in the direction along the length of the cutting edge. Preferably, the width of the chip forming groove is in the range of 1.0 mm to 3.5 mm.

Figure 8:
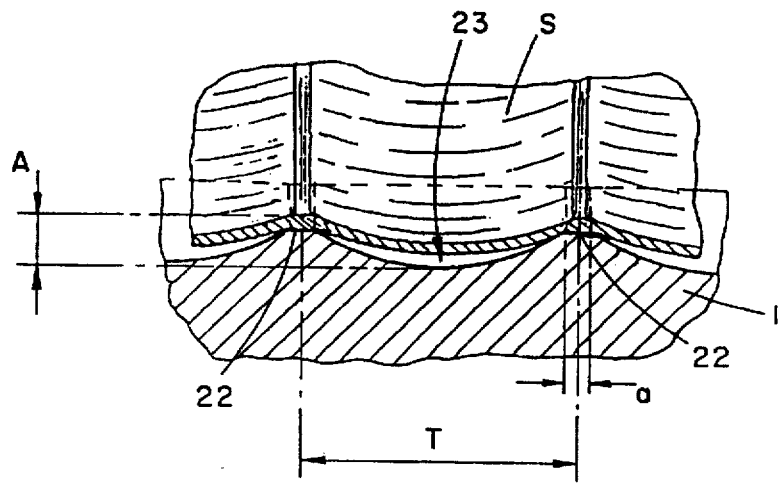
FIG. 8 is a cross-sectional view of a portion of the cutting edge of the insert during the drilling operation in a direction parallel thereto and perpendicular to the cutting edge base.

As shown in FIGS. 1, 2, 3 and 8, the chip forming groove 15 is undulated along the direction of the cutting edge and comprises a succession of depressed portions 20 merging smoothly with and spaced one from another by raised portions 21. As shown in FIG. 8, the undulations of the chip forming grooves has a period T and an amplitude A. Each raised portion 21 is formed with a truncated top potion 22 having a width α which is substantially less than a distance between the mid-points of the truncated top portions 22 of two adjacent raised portions 21, i.e. than the period T. As seen in FIG. 1 and also in FIG. 3, the depressed and the raised portions 20, 21 extend substantially perpendicularly to the cutting edge all along the width of the chip forming groove 15 so that each pair of adjacent truncated top portions 22 define therebetween a chip guiding path 23 extending perpendicularly to the cutting edge 10. Preferably, the width α of each truncated top portion at least does not increase in the direction away from the cutting edge. Thus, in the preferred embodiment, the width α of the truncated top portions 22 as well as the distance T therebetween are substantially invariant along the width of the chip forming groove. Preferably, the distance T is in the range of 1.0 mm to 2.5 mm, the amplitude A is in the range of 0.07 mm to 0.50 mm, and the width α is in the range of 0.12 mm to 0.50 mm.

Figure 2:
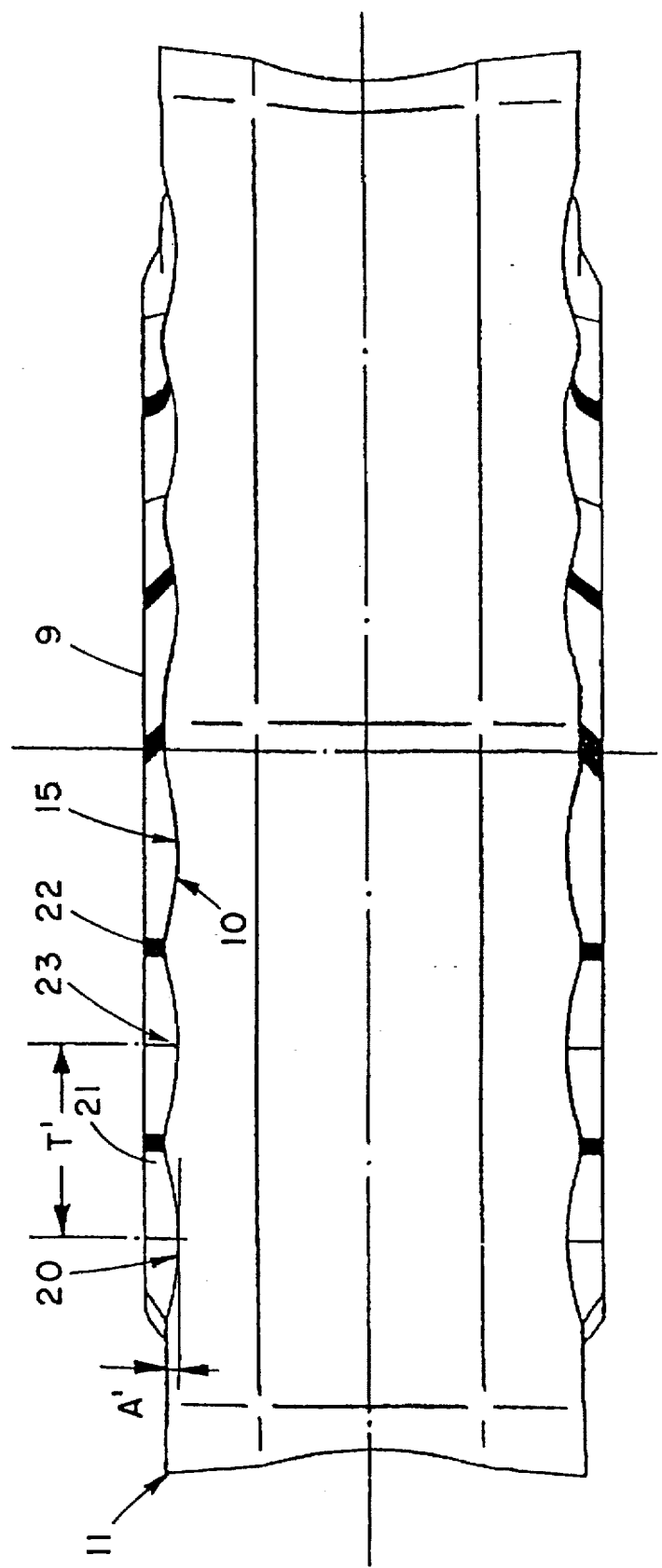
FIG. 2 is a schematic side view of the insert shown in FIG. 1 in the direction II.
Figure 2A:
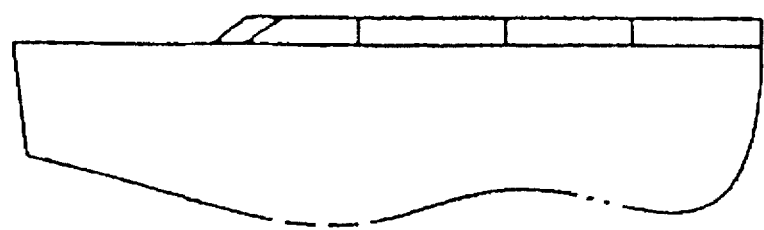
FIGS. 2a and 2b schematically illustrate alternative modified cutting edges of the cutting insert shown in FIG. 2.
Figure 2B:
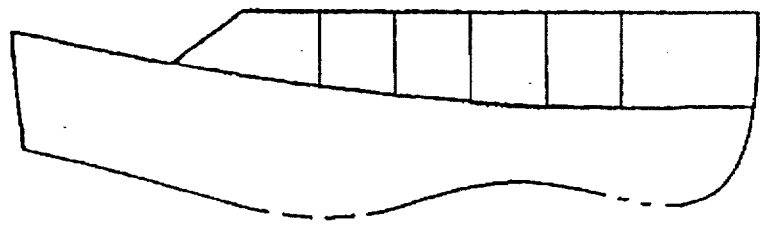

As shown in FIG. 2, the cutting edge 10 preferably undulates in correspondence with the chip forming groove 15. Thus, the period T' of the undulation of the cutting edge 10 and the amplitude A' thereof are substantially equal to the corresponding dimensions T and A of the undulated chip forming groove 15. Alternatively, as shown in FIG. 2a of the drawings, the cutting edge may be rectilinear or, as in FIG. 2b, of concave shape.

Figure 3:
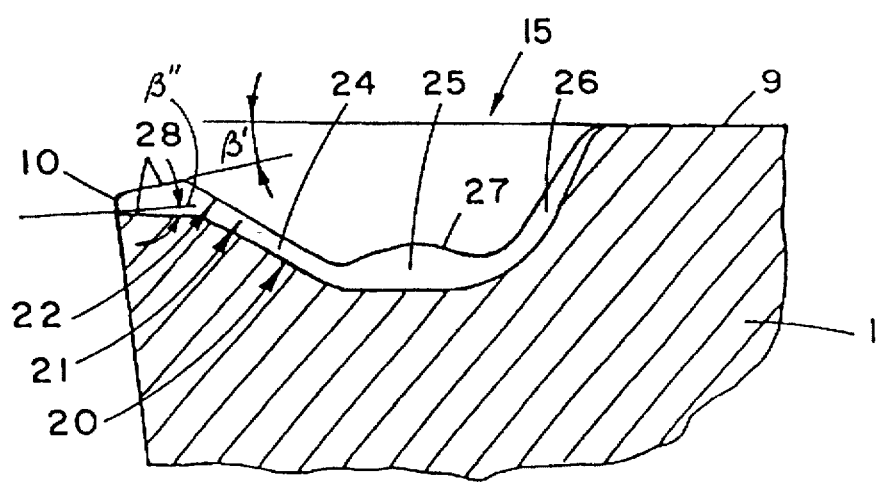
FIG. 3 is a cross-sectional view along the line III—III of the cutting insert shown in FIG. 1.
Figure 2C:
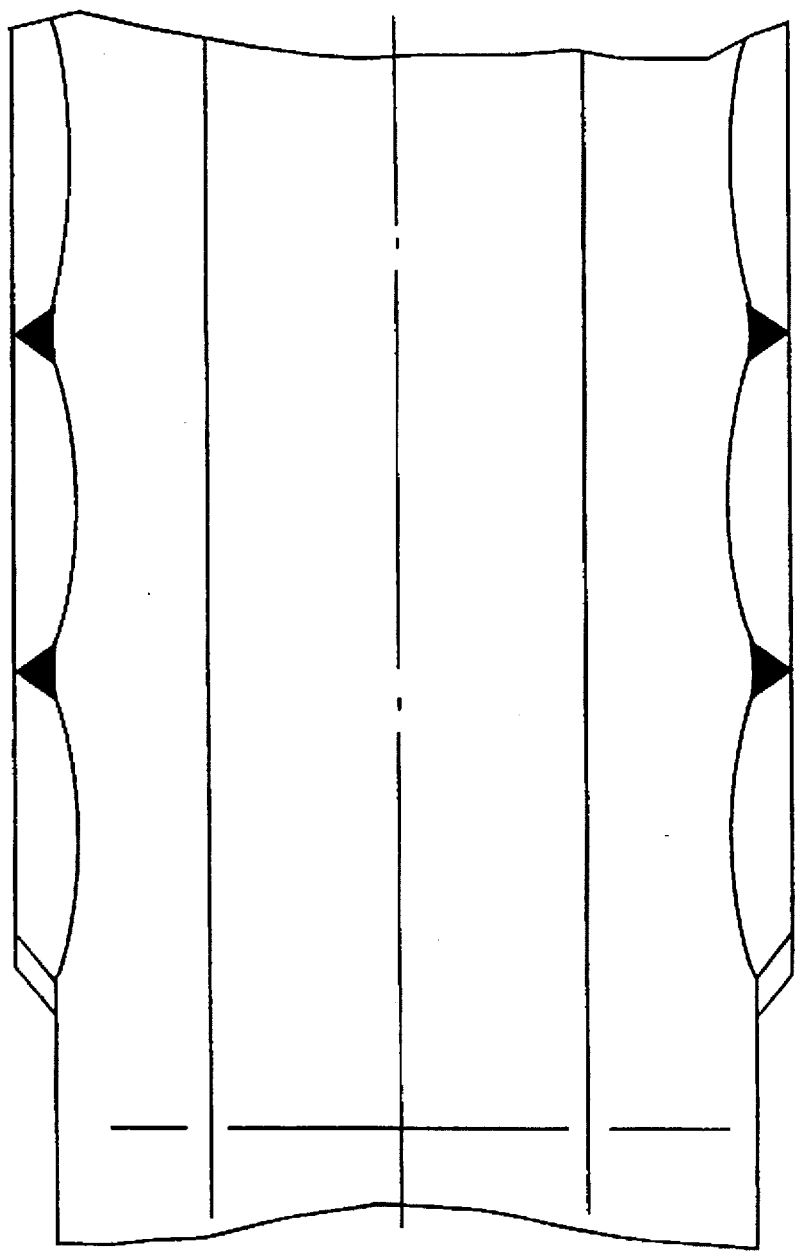
FIG. 2c schematically illustrates the cutting insert of FIG. 2 showing the truncated portions having a varying width.

The cross-sectional shape of the chip forming groove when viewed in the direction of the cutting edge is shown in FIG. 3. It is seen that in this direction the chip forming groove 15 is curved, has a substantially concave shape and is formed with a surface 24 sloping downwardly towards an intermediate portion 25 defining a depth of the chip forming groove 15 and chip deflecting surface 26 rising towards the base surface 9, the transitions between the surfaces being substantially smooth. The depth of the chip forming groove with respect to the main cutting corners 11 is preferably in the range of 0.05 mm to 0.25 mm. It is seen that the profiles of the portions 20, 21 and 22 in the direction of the cutting edge are generally similar, in particular in the region of the sloping and chip deflecting surfaces 24 and 26. However, for provision of additional chip deformation it is preferable, especially in the region of the intermediate portion 25, that the profile of the truncated top portion 22 slightly deviates from its regular shape. Thus, as seen in FIG. 3, the truncated top portion 22 in this region 25 is formed with a raised area 27. Furthermore, this truncated top portion may be of varying lateral dimensions, e.g. may decrease in the direction away from the cutting edge or it may be provided along the length thereof with differently shaped curved sections for varying its width. The truncated top portions can be formed with depressions or protrusions.

As seen, the chip forming groove 15 is preferably spaced from the cutting edge 10 of the insert by a narrow land 28 which is inclined with respect to the base surface 9 of the insert at a variable angle β which is preferably negative, e.g. from −5° to −9°, in the regions of the truncated top portions 22(B') and equal zero or slightly positive, e.g. from 0° to 3°, in the regions of the depressed portions 20(B"). Values of the angle α may vary depending on a material of a workpiece to be machined.

Figure 4:
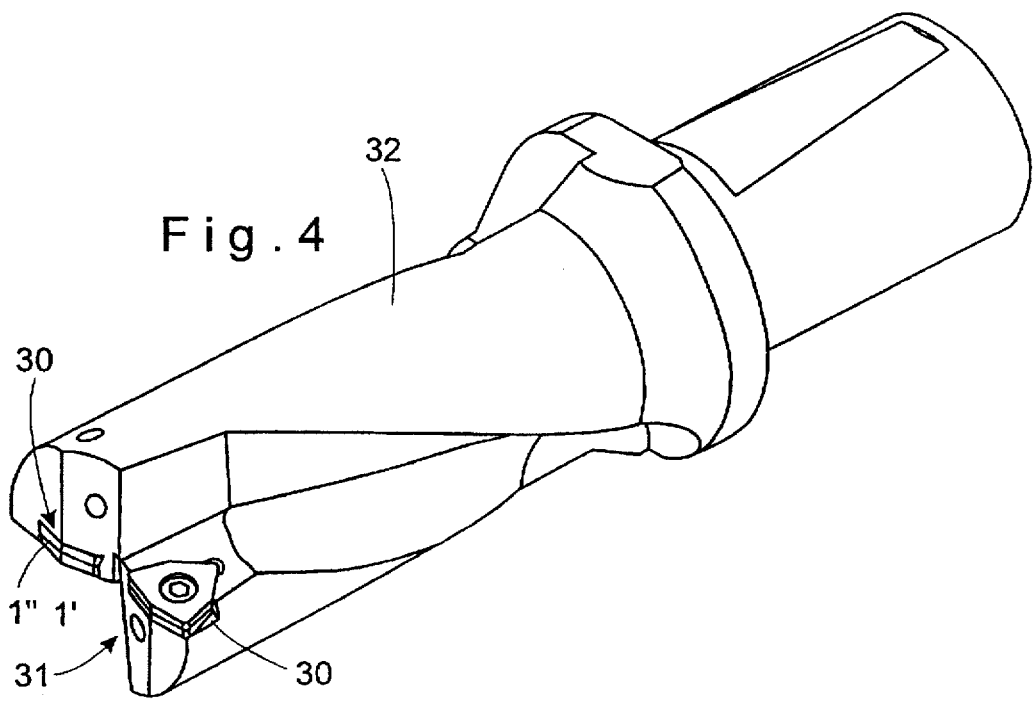
FIGS. 4 and 5 are respectively perspective and front views of a drilling tool employing cutting inserts according to the present invention.
Figure 5:
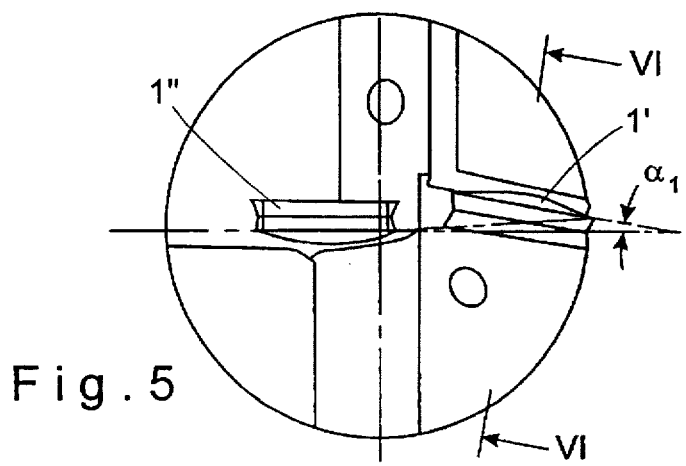
Figure 6:
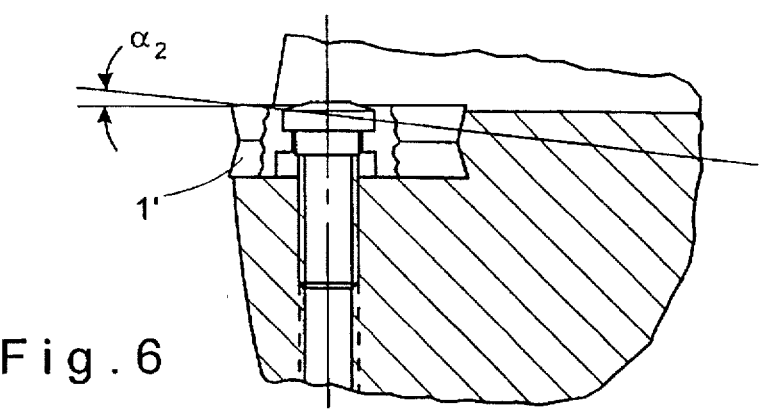
FIG. 6 is a cross-sectional view along the line VI—VI of the cutting tool shown in FIG. 5.

FIGS. 4 to 6 illustrate the cutting inserts 1' and 1", according to the present invention, mounted in pockets 30 formed at a leading end 31 of tool holder 32 of a drilling tool In view of their double-positive relief geometry, both inserts 1' and 1" are mounted at negative axial rake angles (only α2 of the insert 1' being seen) and the peripherally disposed insert 1'-also at a negative radial rake angle α1. The centrally disposed insert 1" is positioned along the central plane of the tool, i.e. its radial rake angle is neutral. Preferably, the axial rake angle $α_2$ of the insert 1' is in the range of 3.5° to 6.5°, e.g. is approximately 5°.

FIGS. 7, 8, 9 and 10 schematically illustrate a disposition of the cutting insert 1' with respect to a workpiece W during drilling therein of a hole H having a face surface W' and a cylindrical side surface W" which is substantially coaxial with a rotary axis (not shown) of the drilling tool.

As seen in FIGS. 9 and 10, due to the double-positive relief geometry of the insert 1', angles α1' and α2' are wider than the axial and radial angles α1 and α2 at which the insert is mounted in the tool. Thus, the insert is provided with increased effective clearances as well as with increased effective radial and axial cutting angles, without unduly weakening of the cutting edge. In addition to and in consequence of these advantages, the double-positive relief flank geometry of the insert contributes to a prolongation of the insert life seeing that with such a geometry a radial wear R of the relief flank is decreased.

Figure 7:
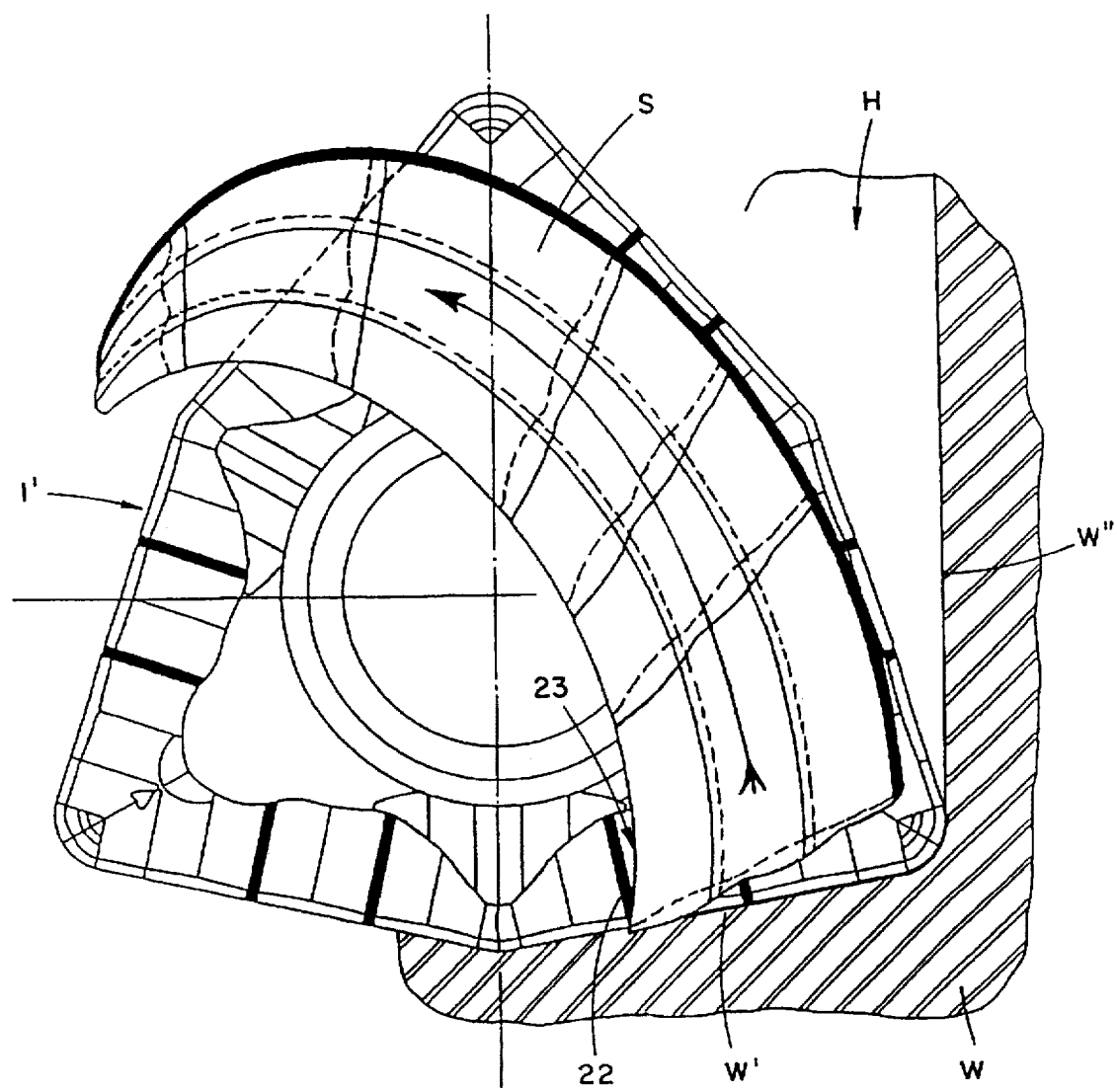
FIG. 7 is a schematic front view of the cutting insert as shown in FIG. 1 when located within the hole being drilled in a workpiece.
Figure 11:
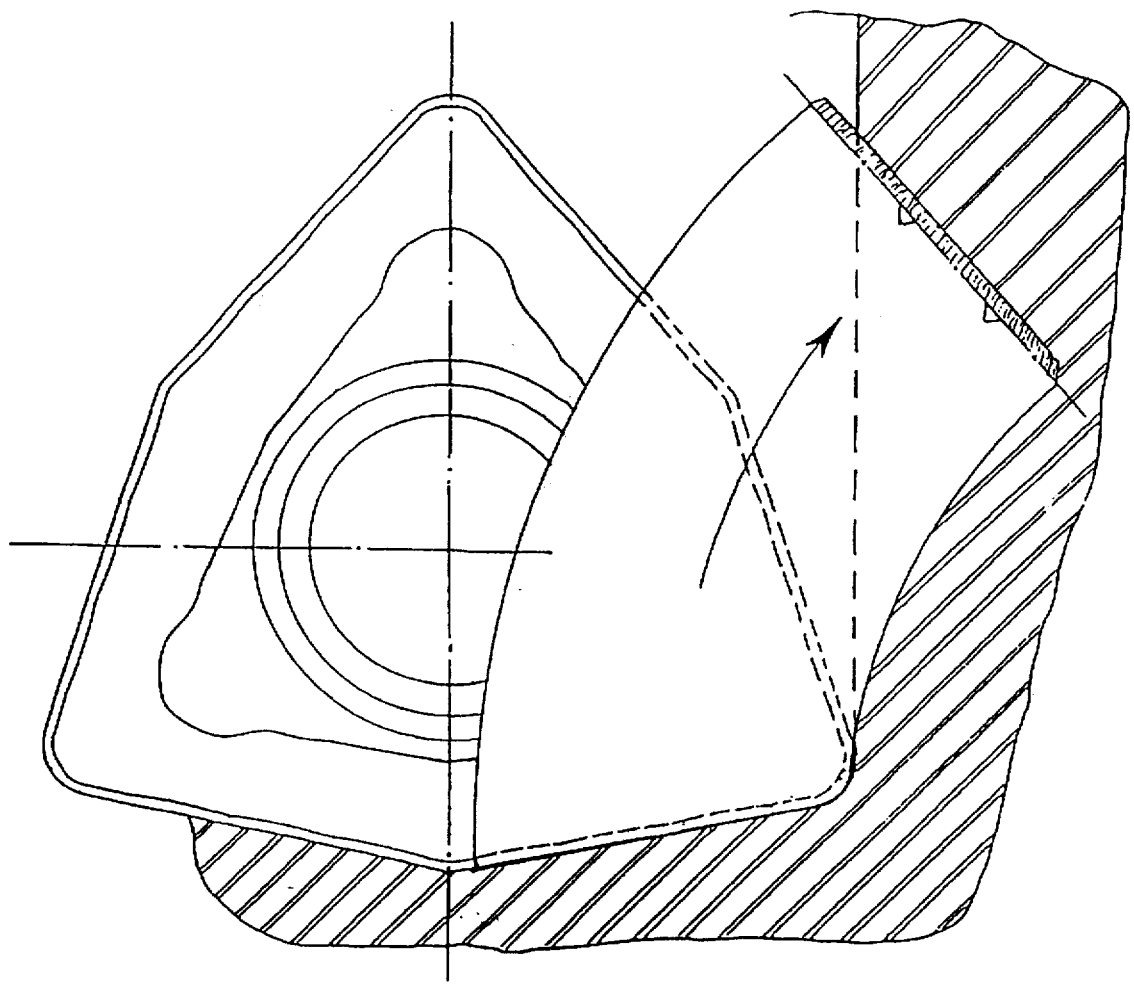
FIG. 11 is a schematic front view of a conventional cutting insert during a drilling operation.

It is schematically illustrated in FIGS. 7 and 8 that the specific design of the insert according to the present invention and, in particular, of its rake face ensures that at the beginning of a cutting action, when the insert starts its penetration into the workpiece, the truncated top portions 22 of the chip forming groove 15 are the first to contact the workpiece. Due to the specific design of the chip forming groove 15, the chip guiding paths 23 orient a chip strip S cut during the cutting action in the direction away from the workpiece W (FIG.7). This can be contrasted with the operation of a conventional insert shown in FIG.11, where the direction of the chip strip is towards the workpiece. It is also ensured that due to the fact that the contact between the cutting insert 1 and the chip strip S occurs at predetermined narrow regions, i.e. along the truncated top portions 22 and in the vicinity thereof (FIG. 8), thermal loading of the insert will be reduced. Furthermore, the design of the truncated top portions and provision in the vicinities thereof of the specifically inclined land strengthens the insert at these specific regions of the contact.

Thus, all the above advantages of the chip forming groove according to the present invention enable an effective use of double-sided inserts and, especially, of double-positive inserts, in particular, in the cutting operations of the above-specified kind and ensures that during these operations an intensive deformation of the chip and its subsequent embrittlement, due to direction of chip flow in a desired manner, takes place.

It should be mentioned that inserts according to the present invention may have features other than those disclosed by way of example in the description of the preferred embodiment thereof. Thus, the insert may have a shape other than a trigon one, e.g. it may be square. The insert may also be single-sided and/or have relief flank geometry of any suitable type. The specific shape and dimensions of the insert may vary depending on materials to be machined. Thus, the undulating cutting edge is recommended for machining of steel, rectilinear cutting edge—for machining of cast iron and curling edge with positive rake angle—for machining of austenitic steel and aluminum.

The shape of the chip forming groove may vary in the direction along and perpendicular to the cutting edge. Thus,

We claim:

1. A cutting insert for use in a cutting tool, said insert having upper and lower and side surfaces and at least one cutting edge formed at an intersection of the upper surface and one side surface and extending between two adjacent main cutting corners of the insert, regions of the upper and side surfaces adjacent the cutting edge constituting respectively rake and relief flank faces;

said rake face being formed with an undulated chip forming groove extending along said at least one cutting edge and comprising alternating depressed and raised portions smoothly merging with one another;

said depressed and raised portions being generally concave in their cross-section taken in the direction perpendicular to said cutting edge and each having a sloping surface extending downwardly away from the cutting edge, a chip deflecting surface rising upwardly away from the cutting edge and an intermediate portion therebetween;

each raised portion being formed with a truncated top portion of a width which is substantially less than a distance between two adjacent truncated portions.

2. A cutting insert according to claim 1, wherein a dimension of said depressed and raised portions in a direction perpendicular to the cutting edge defines a width of the chip forming groove.

3. A cutting insert according to claim 1, wherein the widths of the truncated portions decrease in the direction away from the cutting edge.

4. A cutting insert according to claim 1, wherein the widths of the truncated portions are invariant.

5. A cutting insert according to claim 1, wherein said insert has a central base surface which projects above said main cutting corners of the cutting insert and said chip deflecting surface of said depressed and raised portions merges with said central base surface.

6. A cutting insert according to claim 1, wherein said chip forming groove is spaced from the cutting edge of the insert by a land.

7. A cutting insert according to claim 6, wherein said insert has a central base surface which projects substantially above the main cutting corners of the insert and said land is disposed lower than said central base surface.

8. A cutting insert according to claim 6, wherein said land undulates in correspondence with said alternating depressed and raised portions.

9. A cutting insert according to claim 8, wherein an angle of inclination of said land with respect to a base surface of the insert varies along the cutting edge so that a cutting wedge angle of the insert has its maximal value substantially adjacent the truncated top portions.

10. A cutting insert according to claim 1, wherein the cutting edge of the insert is substantially rectilinear.

11. A cutting insert according to claim 1, wherein the cutting edge of the insert is substantially concave.

12. A cutting insert according to claim 1, wherein the cutting insert is a double-sided indexable cutting insert of a polygonal shape, said insert having a plurality of cutting edges formed at intersections of the side surface of the insert with its upper and lower surfaces, regions of said upper and lower surfaces and of said side surface adjacent each cutting edge of the insert constituting respectively upper and lower rake and relief flank faces of the insert.

13. A cutting insert according to claim 12, wherein the relief flank faces of the insert are perpendicular to the upper and lower surfaces thereof.

14. A cutting insert according to claim 12, wherein said upper and lower relief flank faces are inclined to the associated rake faces by an acute angle.

15. A cutting insert according to claim 14, wherein the insert is designed for mounting in said tool at a negative axial rake angle which is in the range of 3.5° to 6.5°.

16. A cutting insert according to claim 1, wherein said upper and lower relief flank faces are separated by a recess.

17. A cutting tool having a cutting insert mounted therein, said insert having upper, lower and side surfaces and at least one cutting edge formed at an intersection of the upper surface and the side surface thereof, regions of the upper and side surfaces adjacent the cutting edge constituting respectively rake and relief flank faces, the rake face being formed with an undulated chip forming groove extending along said at least one cutting edge and comprising a succession of alternating depressed and raised portions smoothly merging with one another, wherein said depressed and raised portions having a substantially concave shape in cross-section perpendicular to the cutting edge and each raised portion is formed with a substantially truncated top portion of a width which is substantially less than a distance between two adjacent truncated top portions, said insert is double-sided and indexable and has a polygonal shape, and is formed with a plurality of cutting edges at intersections of the side surface of the insert with its upper and lower surfaces, regions of said upper and lower surfaces and of said side surface adjacent each cutting edge of the insert constituting respectively upper and lower rake and relief flank surfaces of the insert, said upper and lower relief flank faces are inclined to the associated rake faces at an acute angle, and said insert is adapted to be mounted in said tool at a negative axial rake angle which is in the range of 3.5° to 6.5°.

* * * * *